United States Patent [19]

Leppa

[11] Patent Number: 4,936,100
[45] Date of Patent: Jun. 26, 1990

[54] REFRIGERATED TRANSPORTATION CONTAINER AND REFRIGERATED DISTRIBUTION METHOD

[75] Inventor: Peter J. Leppa, Orland Park, Ill.

[73] Assignee: Havi Corporation, Westmont, Ill.

[21] Appl. No.: 153,473

[22] Filed: Feb. 1, 1988

Related U.S. Application Data

[63] Continuation-in-part of Ser. No. 49,647, May 12, 1987, abandoned.

[51] Int. Cl.$^5$ .............................................. F25B 19/00
[52] U.S. Cl. ...................................... 62/52.1; 62/175; 62/332
[58] Field of Search ................. 62/514 R, 332, 64, 62, 62/175, 50.2, 52.1

[56] References Cited

U.S. PATENT DOCUMENTS

| | | | |
|---|---|---|---|
| 3,287,925 | 11/1966 | Kane et al. | 62/514 R |
| 3,507,128 | 4/1970 | Murphy et al. | 62/332 R |
| 4,060,400 | 11/1977 | Williams | 62/332 |

OTHER PUBLICATIONS

"Trucks for Food Handling" in Encyclopedia of Food Engineering, pp. 804 and 805 (Hall, et al. ed., AVI Publ. Co., Inc. 2d ed. 1986).
Cook, "Refrigerated Storage" in Encyclopedia of Food Engineering, pp. 687–711 (Hall, et al. ed., AVI Publ. Co. Inc., 2d ed. 1986).
C. L. Newton, "Cryogenics" in Kirk-Othmer, Encylopedia of Chemical Technology, vol. 7, pp. 227–229 and 238–242 (3d ed. 1982).
Kirk-Othmer, *Encyclopedia of Chemical Technology*, vol. 20, pp. 78–103 (3d ed. 1982).
A technical bulletin of Thermo-King, Minneapolis, MN, identified as TK-9181 2-86.
A technical bulletin of Thermo-King, Minneapolis, MN, identified as TK9166 3/85.

Primary Examiner—William E. Wayner
Attorney, Agent, or Firm—Willian, Brinks, Olds, Hofer, Gilson & Lione

[57] ABSTRACT

A refrigerated transportation container having associated therewith a cryogenic refrigeration unit and a recirculation refrigeration unit is provided. The cryogenic unit allows an initial rapid cooling of the container's interior and the recirculation unit allows the efficient maintenance of the temperature of the container's interior during transport. The container is particularly useful in a method of distributing refrigerated products to a plurality of geographically spaced distribution locations. The rapid cool down of the container's interior allows a quick return of the interior to a predetermined transport temperature which, in turn, allows minimization of the risks of a failure to maintain the products at said predetermined transport temperature.

17 Claims, 1 Drawing Sheet

REFRIGERATED TRANSPORTATION CONTAINER AND REFRIGERATED DISTRIBUTION METHOD

This application is a continuation-in-part of application Ser. No. 049,647, filed May 12, 1987 now abandoned.

FIELD OF THE INVENTION

In one aspect, this invention relates to refrigerated transportation containers, e.g., refrigerated trailers, useful in transporting refrigerated articles or compositions. In another aspect, this invention relates to a method of distributing refrigerated articles and compositions using such a refrigerated transportation container.

BACKGROUND OF THE INVENTION

The transportation of refrigerated products (i.e. refrigerated articles and/or compositions) is generally accomplished by storage of the product in a refrigerated container. The most common method of cooling a refrigerated container is the use of a recirculating refrigeration unit which recirculates a refrigerant gas, e.g., a Freon chlorofluorocarbon, through a direct expansion refrigeration cycle. Such units are generally driven by an outside power source, e.g., power takeoff from the tractor of a tractor trailer, or by a dedicated self-contained power source, e.g., a small gasoline or diesel engine or electric motor.

Another method of cooling used in the transport of refrigerated products is by the use of a container fitted with cold plates. The cold plates are filled with a eutectic solution, e.g. a brine, that is refrigerated and frozen when the container is connected to a refrigeration system at a terminal. While this system is mechanically simple and dependable, the system is inefficient and does not have the flexibility of a recirculation system.

A third system used in refrigeration of transportation containers are cryogenic systems which use a reserve of super-cooled gas, e.g., liquid nitrogen or carbon dioxide, as a refrigerant. The super-cooled, i.e. cryogenic, gas is allowed to expand, e.g., by spraying into the interior of the container, and thereby cool the container.

While the rapid cooling to very low temperatures provided by the cryogenic system may be desirable, it has been found the weight and bulk of the cryogenic refrigerant reserve transported with the container often makes the system unfeasible, especially where great refrigerant demands are encountered. While the recirculation refrigeration units commonly used are much less bulky, they are not as efficient at quickly cooling the container to refrigeration temperatures after exposure of the interior to an ambient atmosphere. Such quick cooling, i.e. rapid pull down, is especially useful in preventing thawing of a frozen food. In particular, in a distribution system where the container is opened a number of times for removal of only a portion of a transported, frozen load, the commonly used recirculation units may allow a significant portion of the load to thaw before it is delivered.

SUMMARY OF THE INVENTION

This invention relates to a refrigerated transportation container useful in the distribution of refrigerated products to a plurality of geographically spaced distribution locations comprising:

(a) a cryogenic refrigeration unit associated with said container adapted to first cool the interior of said container; and (b) a recirculation refrigeration unit associated with said container adapted to maintain said interior at a predetermined transport temperature.

The container of this invention is particularly useful in a method of distributing refrigerated products to a plurality of geographically spaced distribution locations comprising:

(a) loading the interior of a refrigerated transportation container of this invention with refrigerated products, (b) transporting said container to a first location;

(c) opening said container to unload a portion of said refrigerated products from said interior and expose said inetrior to an ambient atmosphere;

(d) closing said container;

(e) first cooling said interior with the cryogenic refrigeration unit of said container, (f) then maintaining said interior at a predetermined temperature with the recirculation refrigeration unit of said container during transport of said container to a second distribution location.

The use of the container of this invention allows for quick recovery of the transport temperature after opening the container at multiple delivery stops. The container and method of this invention are particularly useful in the distribution of frozen bakery products, especially frozen breads, e.g. sandwich rolls, (particularly hamburger buns) which frozen products are especially prone to thawing during transportation along a delivery route having a number of stops for delivery of the frozen products. In general, steps (c) through (f) of the method will be repeated more than once for a particular load of refrigerated products.

In preferred embodiments, the transportation container also has means associated therewith for storing a reserve of cryogenic liquid sufficient for said first cooling; in particularly preferred embodiments said reserve is insufficient to maintain said predetermined temperature during transport of the container between a plurality of distribution locations. By "transportation container" is meant any structure which will securely contain the refrigerated products during transport thereof. As used herein, a "cryogenic refrigeration unit" means one which employs the acyclical, i.e. one-time, expansion of an amount of a coolant, e.g., a super-cooled gas, while a "recirculation refrigeration unit" is one which cyclically, i.e. repeatedly, condenses and then allows the expansion of a coolant for cooling. By "associated with said container", it is meant that the unit is mounted on, or even within, said container, or mounted on a vehicle in transport with said container, e.g. a tractor or trailer. Preferred transportation containers are adapted to receive metal dollies which are used to store the refrigerated products while in the container and facilitate removal from the container at the distribution location.

DETAILED DESCRIPTION OF THE INVENTION

Figure 1:
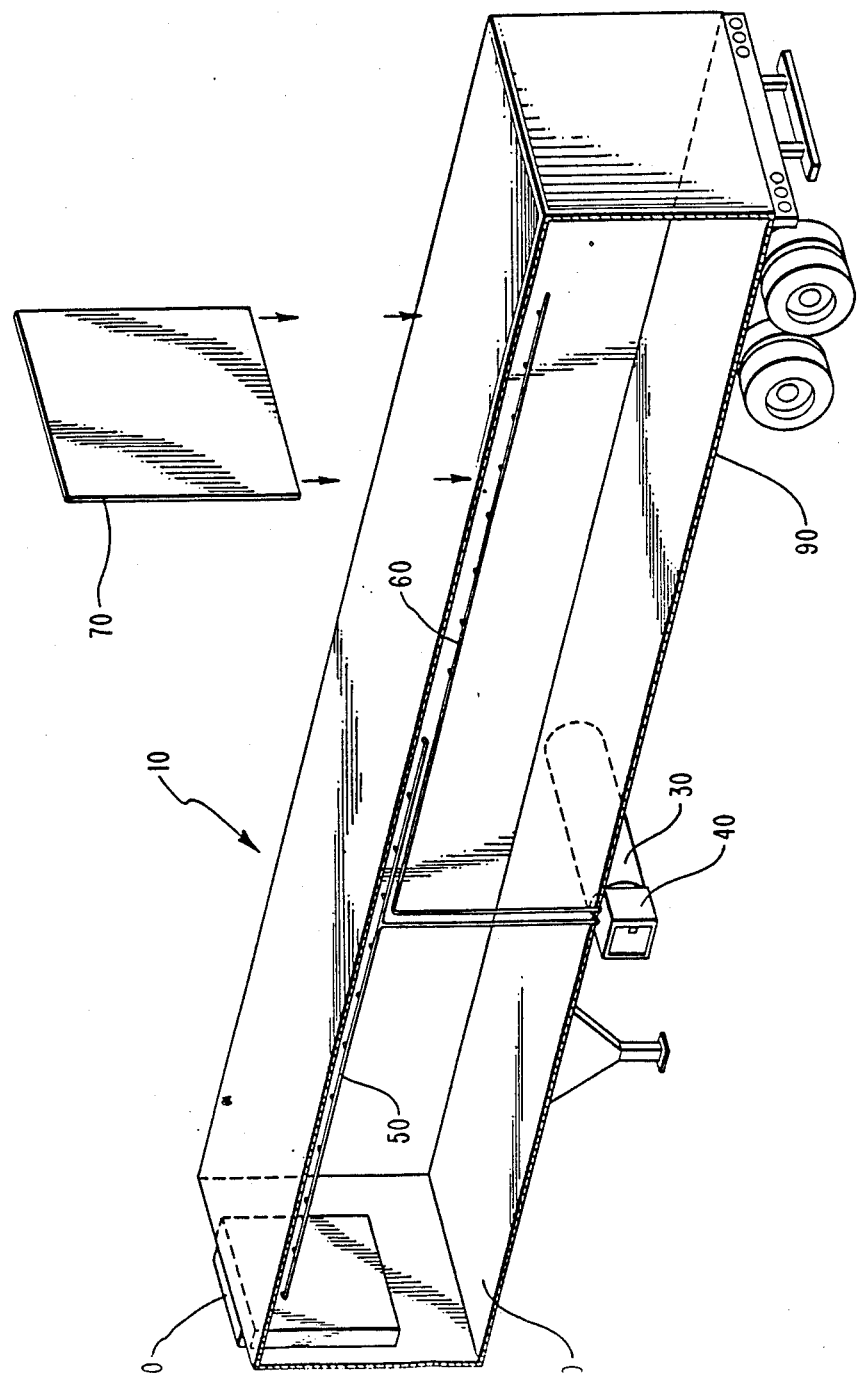
FIG. 1 is a perspective view showing the interior and exterior of a trailer fitted as a container of this invention.

The refrigerated transportation container generally has two means associated therewith for cooling the interior of said container, one means adapted for use with a cryogenic refrigeration unit, and the other means adapted for use with a recirculation refrigeration unit. While these means may share some common elements, it is contemplated that these means will generally be separate. One element that may be commonly shared is a thermostat which can deactivate the cryogenic refrigeration unit when a predetermined transport temperature is reached and activate the recirculation refrigeration unit when that unit is needed to maintain the predetermined transport temperature. This thermostat can also be considered a related element of the invention separate from the cryogenic and recirculation units.

Cryogenic refrigeration units are known in the refrigeration art. These units are typically comprised of a means of introducing a cryogenic fluid into a space to be cooled. Typical means for introducing the cryogenic fluid include means, e.g., nozzles, for spraying the cryogenic fluid into the space to be cooled. Accordingly, preferred means for cooling the interior of a transportation container of this invention consist of means for spraying a cryogenic fluid into said interior. When the refrigerated product may be sensitive to freezing, e.g. a fresh food, steps should be taken to prevent contact of the cryogenic fluid with the products. Such steps may include efficient atomization of a cryogenic liquid which prevents contact of the liquid with the refrigerated product.

Cryogenic refrigeration units may also be comprised of an insulated reservoir of cryogenic refrigerant. Typical reservoirs are constructed much like Dewar flasks which employ metallized glass surfaces and evacuated chambers to insulate the reservoir. Examples of typical cryogenic fluids used in such systems are liquid nitrogen and liquid carbon dioxide.

Under conditions of at least moderate or high atmospheric humidity, (i.e. when the moisture vapor in the atmosphere in the container is more than sufficient to saturate the atmosphere at the intended transport temperature, e.g. when the intended transport temperature is about 0° C. and the local climatic relative humidity is about about 20% r.h. at 20° C.), the cryogenic unit serves to rapidly condense at least a portion of the moisture vapor in the container. This lessens the refrigeration load on the recirculation unit and provides for a rapid pull down of the temperature of the container's interior. In typical embodiments, the cryogenic unit will remove substantially all of the excess moisture vapor, if any, and will cool the interior to the desired predetermined transport temperature before the recirculation unit is activated to maintain the predetermined transport temperature.

While the cryogenic unit may be deactivated by a thermostat, it is contemplated that manual deactivation, or the use of a timer to automatically deactivate the unit at a given interval after activation, will also be useful. Manual or timed deactivation may be particularly useful when the cryogenic unit is used simply to rapidly condense a portion of the excess moisture vapor in the interior atmosphere and thereby lessen the load on the recirculation refrigeration system. The time needed to accomplish the desired degree of condensation for a given load or type of load can be readily determined by routine experimentation.

Typical recirculation refrigeration units are comprised of a liquid-vapor cycle. The cycle is comprised of a compressor which pumps vapor to a condenser. The vapor is condensed in a condenser and pumped through an expansion valve into an evaporator where it is available to cool a product. A blower is typically associated with the evaporator to circulate air through the evaporator, which cooled air is then directed about the interior of a transportation container to cool the contents thereof. Typical recirculation refrigeration units used for transportation containers are small, direct expansion chlorofluorocarbon refrigeration units driven either by a power takeoff from the tractor of a tractor trailer or a separate small gasoline or diesel engine associated with the trailer. A typical recirculation unit used for transporting frozen foods is sold by Themo-King, Minneapolis, MN, as Model SB-II 30 1500 which has a refrigeration system net cooling capacity at 100° F. (37.8° C.) ambient with return air evaporator at 0° F. ($-17.8$° C.) of 21,000 BTU/hr (5,292 KCal/hr). A unit available from the same manufacturer as Model SB-II 30 MAX has a system capacity under identical conditions of 30,000 BTU/hr. (7,560 KCal/hr) and is described as having faster pull down. These typical units generally maintain container interiors at below about 55° F. (13° C.) for most fresh foods and below about 32° F. (0° C.) for frozen foods.

The invention will now be more specifically described by reference to FIG. 1 and the embodiment shown therein. Said embodiment shows a trailer 1 having recirculation refrigeration unit 20 mounted on the exterior at the front thereof. The cryogenic refrigeration unit is comprised of cylindrical reservoir 30 connected through control piping 40 to injection manifolds 50 and 60. A thermostat (not shown) is connected to both the control piping 40 and unit 20 to deactivate the cryogenic unit and activate unit 20 at the proper times. In preferred embodiments, the injection manifold will be bifurcated with means to deactivate a portion of the manifold when the corresponding portion of the container is emptied of refrigerated product. Bulkhead divider 70 can be used to reduce the amount of the interior that is cooled by dividing the interior can be adapted so that the bulkhead can be periodically repositioned as the container is periodically partially unloaded at each distribution stop. Alternatively, bulkhead 70 can be adapted only for positioning proximate to the midpoint of the container; i.e. between manifolds 50 and 60. When so adapted, bulkhead 70 can be used to partition the container after the load of refrigerated product has been reduced to occupy about less than half the interior volume of the container and thus ensure that the cooled portion of the container which does not contain refrigerated product is generally less than one-half the total interior volume of the container. A specific embodiment of a transportation container of this invention can be constructed by modifying a trailer of the type sold by Great Dane Trailer, as model #7010TZ1, by installing a cryogenic refrigeration system as shown in FIG. 1.

While this invention is particularly useful in the transport of frozen foods, it is contemplated that the invention will find utility in the transport of other materials which should be transported at reduced temperatures, i.e., perishable produce, food ingredients, food by-products, and temperature-sensitive materials and chemicals, e.g., temperature sensitive pharmaceuticals. Likewise, while the transportation container may be a trailer, other types and sizes of containers are within the scope of this invention, including refrigerated vans and refrigerated compartments of vehicles or vessels.

What is claimed is:

1. A method of distributing refrigerated products comprising:
    (a) exposing the interior of a container having refrigerated products therein to an ambient atmosphere, said container having a cryogenic refrigeration unit and a recirculation refrigeration unit associated therewith;
    (b) at all interior temperatures first cooling said interior with the cryogenic refrigeration unit of said container with the recirculation refrigeration unit being off, wherein said first cooling is sufficient to condense at least a portion of the moisture vapor in the atmosphere of said interior; and
    (c) then maintaining said interior at a predetermined transport temperature with the recirculation refrigeration unit of said container.

2. A method of claim 1 wherein said steps are repeated one or more times with respect to at least a portion of said refrigerated products.

3. A method of claim 1 wherein said refrigerated products are frozen food products.

4. A method of claim 3 wherein said products are bread products.

5. A method of claim 4 wherein said bread products are supported in said container in a plurality of metal dollies.

6. A method of claim 1 wherein said first cooling is sufficient to lower the temperature of said interior to said predetermined transport temperature.

7. A container of claim 1 wherein said cryogenic unit is adapted to condense substantially all excess moisture vapor contained in the atmosphere of said interior and cool the interior to the predetermined transport temperature.

8. A container of claim 1 wherein said cryogenic unit is adapted to first cool said interior upon closure of the container after exposure of the interior to an ambient atmosphere.

9. A container of claim 1 wherein said cryogenic refrigeration unit is adapted to first condense at least a portion of the moisture vapor in the atmosphere of said interior upon closure of the container after exposure of said interior to an ambient atmosphere.

10. A method of claim 1 wherein said first cooling is to a temperature below about 13° C.

11. A method of claim 1 wherein said first cooling is to a temperature below about 0° C.

12. A method of claim 1 wherein said first cooling is from a temperature higher than or equal to about 0° C.

13. A method of claim 1 wherein said first cooling is from a first temperature higher than or equal to about 0° C. to a second temperature below about 0° C.

14. A method of distributing refrigerated products comprising:
    (a) exposing the interior of a container having refrigerated products therein to an ambient atmosphere, said container having a cryogenic refrigeration unit and a recirculation refrigeration unit associated therewith;
    (b) at all interior temperatures first cooling said interior with the cryogenic unit of said container with the recirculation refirgeration unit being off from a first temperature higher than or equal to about 0° C.; and
    (c) then maintaining said interior at a predetermined transport temperature with the recirculation refrigeration unit of said container.

15. A method of claim 14 wherein said first cooling is to a second temperature below about 0° C.

16. A method of distributing frozen food products to a plurality of geographically spaced distribution locations comprising:
    (a) loading the interior of a refrigerated transportation container with frozen food products, said container having a cryogenic refrigeration unit and a recirculation refrigeration unit associated therewith;
    (b) transporting said container to a first location;
    (c) opening said container to unload a portion of said frozen food products from said interior and expose said interior to an ambient atmosphere;
    (d) closing said container;
    (e) at all interior temperatures first cooling said interior to condense at least a portion of the moisture vapor in the atmosphere of said interior with the cryogenic refrigeration unit of said container with the recirculation refrigeration unit being off;
    (f) then maintaining said interior at a predetermined temperature below about 0° C. with the recirculation refrigeration unit of said container during transport of said container to a second distribution location.

17. A method of claim 16 wherein said first cooling is sufficient to lower the temperature of said interior to said predetermined transport temperature.

* * * * *

UNITED STATES PATENT AND TRADEMARK OFFICE
CERTIFICATE OF CORRECTION

PATENT NO. : 4,936,100

DATED : June 26, 1990

INVENTOR(S) : Peter J. Leppa

It is certified that error appears in the above-identified patent and that said Letters Patent is hereby corrected as shown below:

In column 2, line 18, please delete "inetrior" and substitute therefor --interior--.

In column 3, line 47, please delete the first occurrence of "about" and substitute therefor --above--.

Signed and Sealed this

Twenty-ninth Day of September, 1992

*Attest:*

DOUGLAS B. COMER

*Attesting Officer*     *Acting Commissioner of Patents and Trademarks*